(12) United States Patent
Clark

(10) Patent No.: US 7,712,708 B2
(45) Date of Patent: May 11, 2010

(54) FASTENER CLIP

(75) Inventor: Sylvester S. Clark, Skokie, IL (US)

(73) Assignee: Illinios Tool Works Inc., Glenview, IL (US)

(*) Notice: Subject to any disclaimer, the term of this patent is extended or adjusted under 35 U.S.C. 154(b) by 323 days.

(21) Appl. No.: 11/800,993

(22) Filed: May 8, 2007

(65) Prior Publication Data

US 2007/0278358 A1   Dec. 6, 2007

Related U.S. Application Data

(60) Provisional application No. 60/810,895, filed on Jun. 5, 2006.

(51) Int. Cl.
| F16L 3/08 | (2006.01) |
| F16L 3/12 | (2006.01) |
| F16L 3/22 | (2006.01) |
| F16F 5/00 | (2006.01) |
| F16F 9/00 | (2006.01) |
| F16F 13/00 | (2006.01) |
| F16F 15/00 | (2006.01) |
| F16M 5/00 | (2006.01) |
| F16M 7/00 | (2006.01) |
| F16M 9/00 | (2006.01) |
| F16M 11/00 | (2006.01) |
| A44B 1/04 | (2006.01) |
| A44B 11/25 | (2006.01) |
| A44B 17/00 | (2006.01) |
| F16G 11/00 | (2006.01) |

(52) U.S. Cl. ............... 248/74.4; 248/74.1; 248/74.2; 248/74.3; 248/68.1; 267/140.11; 24/115 R

(58) Field of Classification Search ............ 248/74.1, 248/74.2, 74.3, 74.4, 68.1; 267/140.11; 24/115 R, 24/487, 16 PB; 104/200; 403/397
See application file for complete search history.

(56) References Cited

U.S. PATENT DOCUMENTS

| 4,478,381 A | | 10/1984 | Pittion et al. |
| 5,535,969 A | * | 7/1996 | Duffy, Jr. .................. 248/68.1 |
| 5,568,906 A | * | 10/1996 | Hahn et al. ............... 248/74.1 |
| 5,984,242 A | | 11/1999 | Meyer |
| 6,053,458 A | * | 4/2000 | Meyer ...................... 248/74.1 |
| 6,315,250 B1 | | 11/2001 | Meyer |

(Continued)

FOREIGN PATENT DOCUMENTS

| DE | 19939081 | 10/2000 |
| DE | 202005008570 | 9/2005 |
| EP | 0069223 | 1/1983 |

OTHER PUBLICATIONS

International Search Report and Written Opinion for PCT/US07/12553.

*Primary Examiner*—J. Allen Shriver, II
*Assistant Examiner*—Christopher Garft
(74) *Attorney, Agent, or Firm*—Mark W. Croll; Paul F. Donovan

(57) ABSTRACT

A fastener or routing clip for use in a vehicle is configured to reduce the surface area of that is in contact with the tube, wire, or cord to which it is mounted. The fastener clip simultaneously reduces vibration noise. The fastener clip may include two ends which may be connected to each other by a swivel hinge, which allows the two ends of the clip to close and snap-fit together. When in the closed position, the two ends, which further define corresponding semi-circular sections, will capture the tube, wire, cord, etc. thereby mounting them to the clip. The clip may then be mounted to the vehicle. The fastener clip may include at least one flex arm having a bulbous-like end that contacts and pushes on the tube, wire, cord, etc. to reduce the amount of surface contact between the tube, wire, cord, etc. and the clip, and functions as a dampener to reduce vibration noise.

19 Claims, 7 Drawing Sheets

U.S. PATENT DOCUMENTS

| | | | |
|---|---|---|---|
| 6,561,465 B2 * | 5/2003 | Kondo | 248/74.3 |
| 6,641,093 B2 * | 11/2003 | Coudrais | 248/73 |
| 7,007,900 B2 * | 3/2006 | Goodwin et al. | 248/68.1 |
| 7,387,282 B2 * | 6/2008 | Kovac | 248/74.4 |
| 2002/0074461 A1 * | 6/2002 | Gombert | 248/74.1 |
| 2005/0109890 A1 * | 5/2005 | Korczak et al. | 248/74.1 |
| 2006/0252586 A1 * | 11/2006 | Nguyen | 473/564 |
| 2006/0273226 A1 | 12/2006 | Jatzke | |

\* cited by examiner

FASTENER CLIP

CROSS REFERENCE TO RELATED APPLICATIONS

This Non-Provisional Application claims benefit to U.S. Provisional Application Ser. No. 60/810,895 filed Jun. 5, 2006.

FIELD OF THE INVENTION

The present invention relates generally to fasteners, and more particularly, to fastener clips commonly referred to as routing clips.

BACKGROUND OF THE INVENTION

It is known that fasteners are used in various applications to perform various functions. It is further known that numerous types of fasteners are used in various automotive applications. A common fastener that is widely used throughout a vehicle is known as a routing clip. Routing clips are used to secure and hold together tubes, wires, cords, cable bundles, rods, springs, or bolts to a vehicle. In the automotive industry, these routing clips may be used under the hood or inside panels of the vehicle.

Many routing clips exist in various shapes and sizes. Many clips are made using multiple materials and are formed using various molding techniques, such as a two-shot mold process or transfer molding where one material (e.g., thermoplastic elastomer) is over-molded onto a plastic substrate, for example. It is also known that routing clips may be made of a single material. It is further known that routing clips may include expandable openings for mounting tubes, wires, cords, cable bundles, rods, springs or bolts, for example, to the vehicle. The expandable openings will permit the tube, wire, cord, etc. to snap fit to the routing clip.

There are however known drawbacks with existing routing clips. For instance, the known routing clips require a large surface area of the clip to be in contact with the tube, wire, cord, etc. in order to function properly and to reduce undesirable vibration noise. Other known drawbacks also exist.

The present invention is directed at overcoming these and other known drawbacks and in particular the need for the clip to have a large surface area to be in contact with the tube, wire, cord, etc. The clip of the invention also reduces undesirable vibration noise, while still providing a cost savings by using a single material to form the clip.

SUMMARY OF THE INVENTION

The present invention is directed to a fastener or routing clip which reduces the surface area of the clip that is in contact with the tube, wire, cord, etc. to which it is mounted, while simultaneously reducing vibration noise. The clip may be made of a single material in order to reduce manufacturing costs. In an exemplary embodiment, the fastener clip of the invention may include two ends which may be connected to each other by a hinge, such as a swivel hinge, which allows the two ends of the clip to close and snap-fit together. When in the closed position, the two ends, which further define corresponding semi-circular sections, will capture the tube, wire, cord, etc. thereby mounting them to the clip. The clip may then be mounted to the vehicle.

In one aspect of the invention, the clip may include a flex arm having a bulbous-like member that contacts the tube, wire, cord, etc., to reduce the amount of surface contact between the tube, wire, cord, etc. and the semi-circular sections of the clip, and to function as a dampener to reduce vibration noise. In another aspect of the invention, the clip may include multiple flex arms and multiple bulbous-like members that contact the tube, wire, cord, etc. in multiple locations.

Other features and advantages of the invention will become apparent to those skilled in the art upon review of the following detailed description, claims and drawings in which like numerals are used to designate like features.

Figure 1:
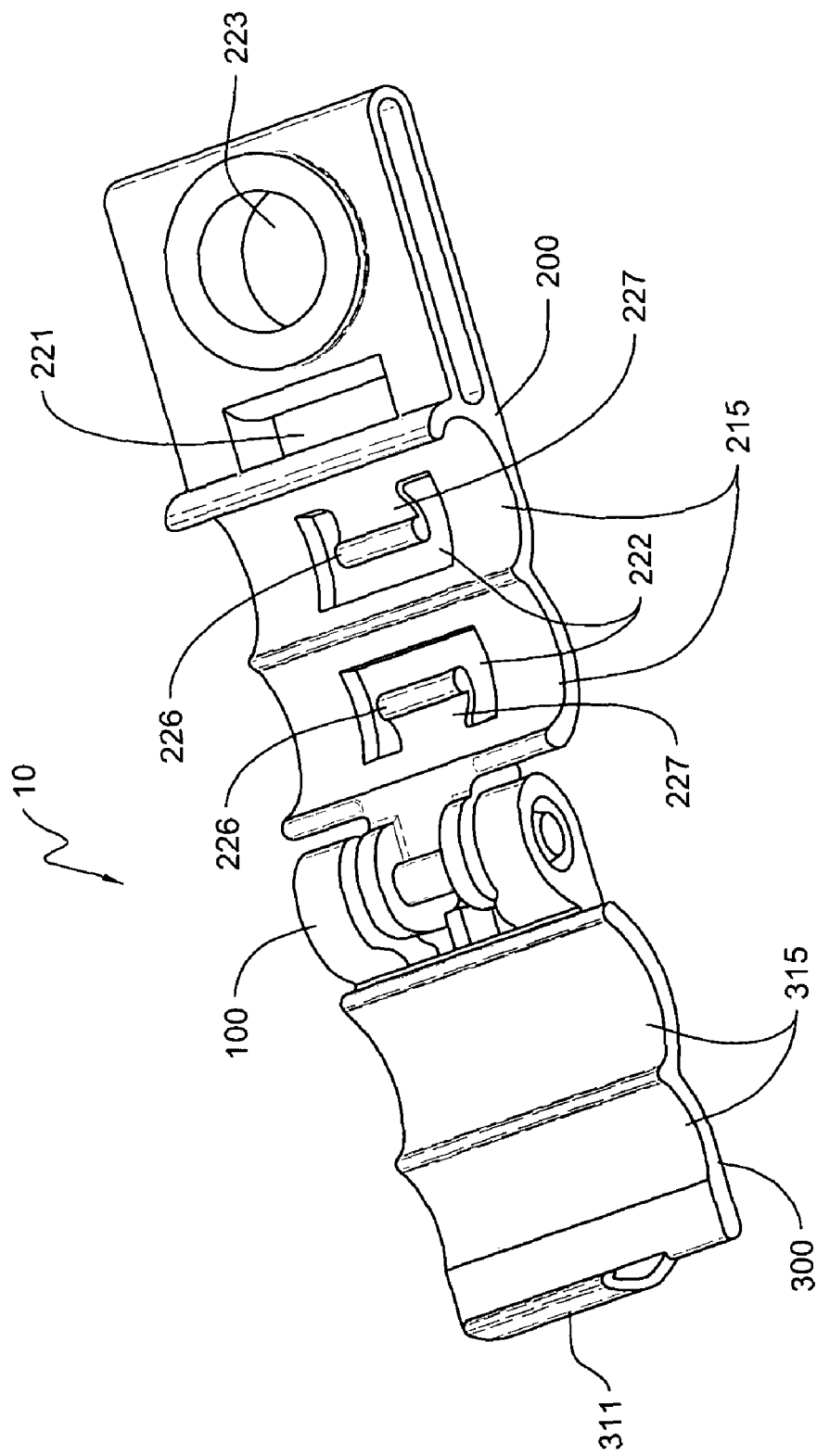
FIG. 1 is an isometric view of an exemplary embodiment of a fastener clip of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The present invention may be embodied in many forms. In one exemplary embodiment depicted in FIG. 1, the present invention is directed to a fastener or routing clip 10. The fastener clip 10 may be made of a single material to reduce manufacturing costs. The material used may be plastic, glass, paper, metal, or any other suitable material. Alternatively, if desired, the fastener clip 10 may be made of more than one material.

Figure 3:
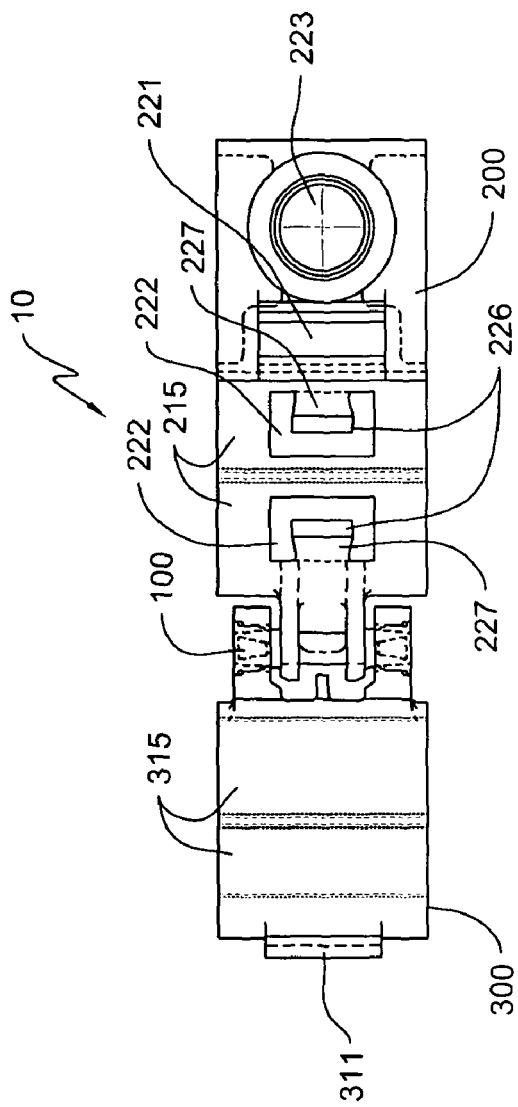
FIG. 3 is a top view of the fastener clip of FIG. 1.
Figure 2:
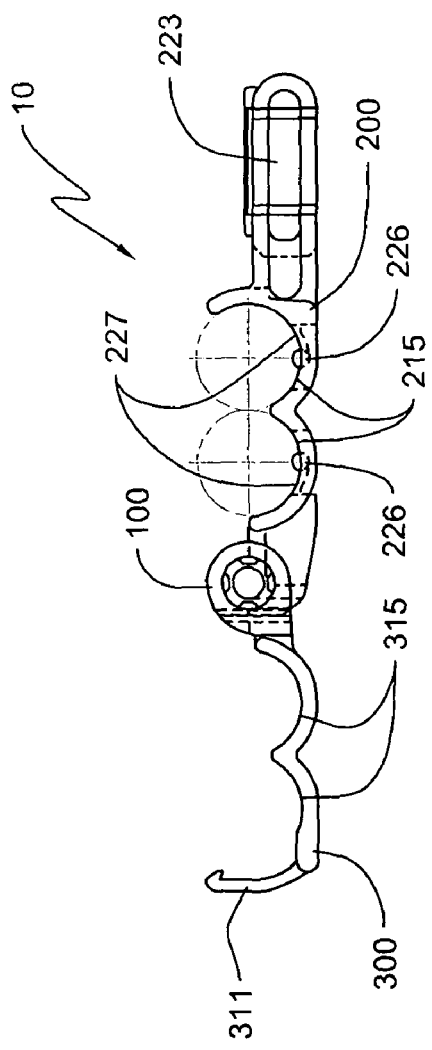
FIG. 2 is a side view of the fastener clip of FIG. 1.
Figure 4:
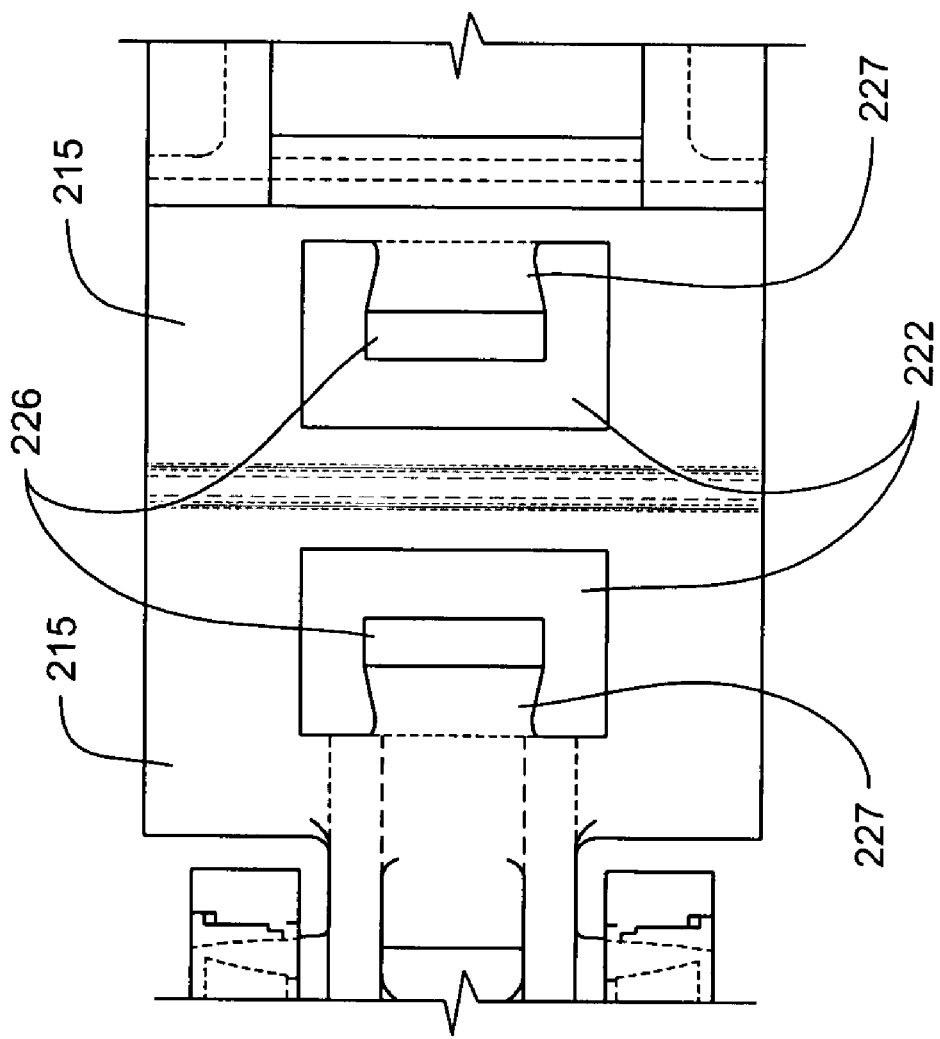
FIG. 4 is a close-up, partial top view of the fastener clip of FIG. 3.
Figure 6:
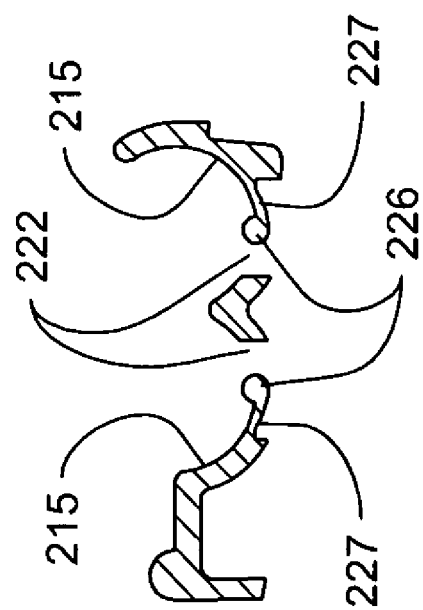
FIG. 6 is a close-up, partial cross-section view of the flex arms of the fastener clip (taken along the longitudinal center line of the fastener clip of FIG. 3).
Figure 5:
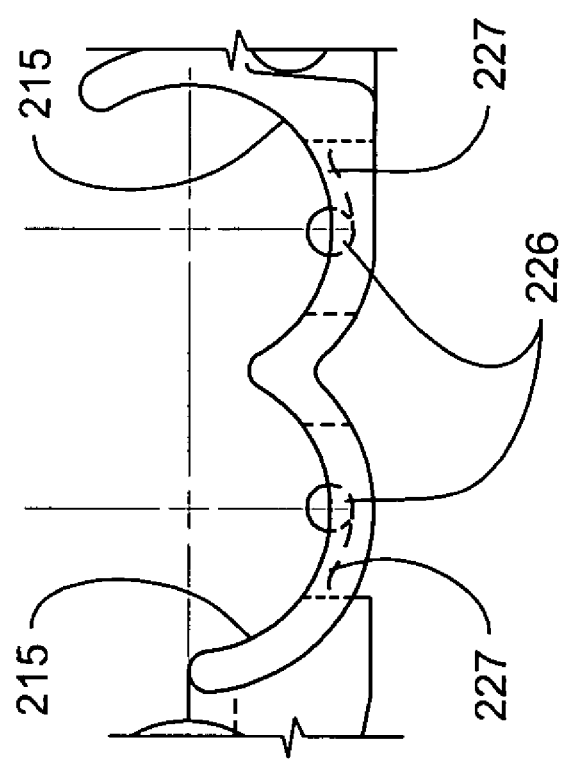
FIG. 5 is a close-up, partial side view of the fastener clip of FIG. 2.

Referring to FIGS. 1-3, the fastener clip 10 defines a first end 300 that is connected to a second end 200 by a hinge 100. The hinge 100 allows the first and second ends to pivot relative to each other and to close together. The hinge 100 may be a swivel hinge that contains a pin which joins the first and second ends. One exemplary embodiment of a swivel hinge that may be used with the invention is described in U.S. Pat. No. 6,053,458, assigned to Illinois Tool Works, Inc. It should be understood that other swivel hinges and hinge types may be used with the invention. Alternatively, other techniques may be employed to join the ends 200 and 300 together.

Figure 7:
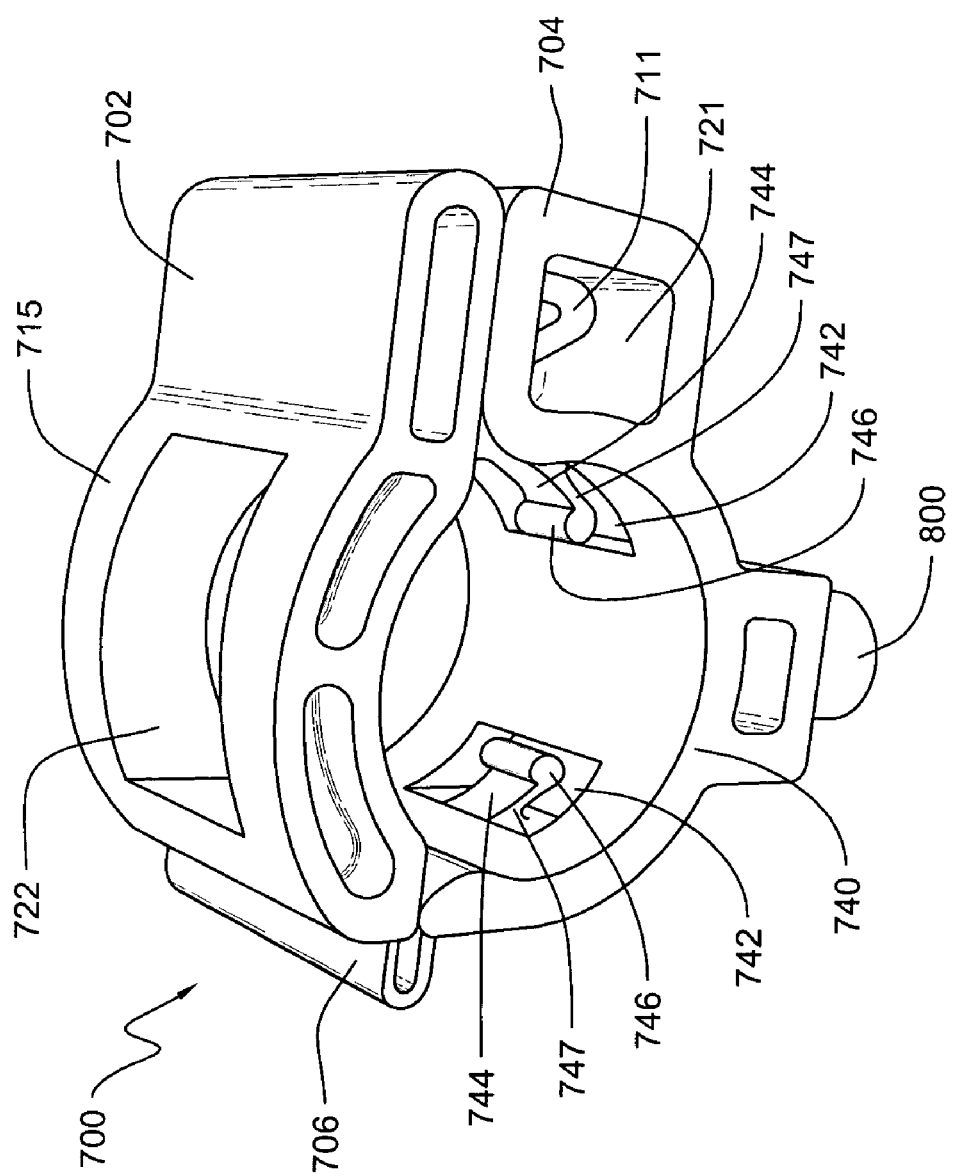
FIG. 7 is an isometric view of another exemplary embodiment of a fastener clip of the present invention.
Figure 8:
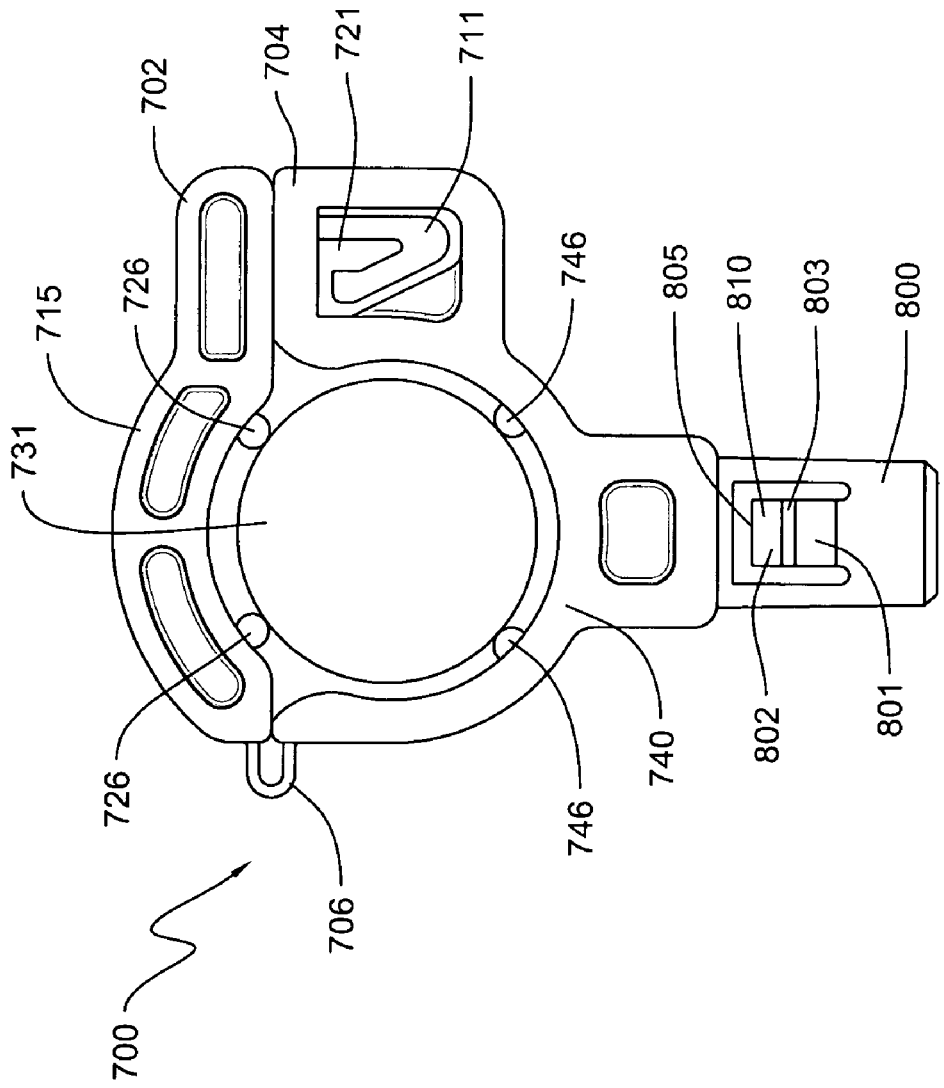
FIG. 8 is a side view of the fastener clip of FIG. 7.
Figure 9:
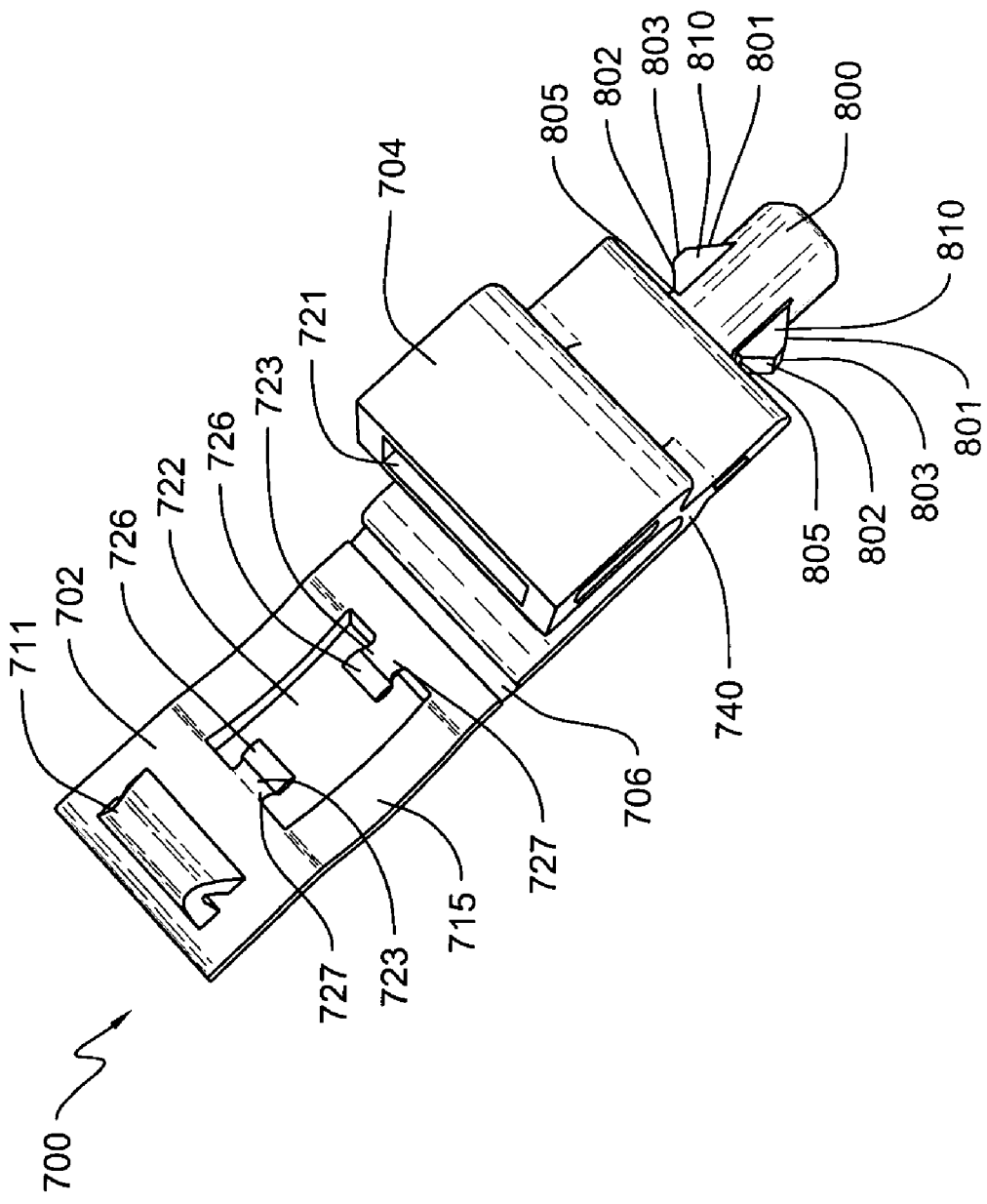
FIG. 9 is an isometric view of the fastener clip of FIG. 7 in an open position.

The first end 300 of the fastener clip 10 may define one or more semi-circular sections 315 used for capturing and isolating tubular members, such as tubes, wires, cords, cable bundles, rods, springs or bolts, for example, which may be mounted to the routing clip 10. It should be understood that the fastener clip 10 may be used to capture and isolate non-tubular members. The first end 300 may further define a hook 311 extending outwardly from the end 300 that may be used to snap fit the first end 300 to the second end 200, as described below. Numerous hook configurations may be used with the invention and numerous other techniques may be employed to join or attach together the first and second ends. While the exemplary embodiment in FIGS. 1-3 illustrates a first end 300 defining two semi-circular sections 315 that may be used to isolate two tubes, wires, cords, etc., the number of semi-circular sections may vary depending on the desired application and the desired number of items being isolated. For example, another exemplary embodiment is depicted in FIGS. 7-9 which illustrates a first end with only one semi-circular section. Thus, it should be apparent that the invention is not limited to the illustrative embodiments depicted in the Figures. Referring back to FIGS. 1-3, the second end 200 of the fastener clip 10 may include a complimentary number of semi-circular sections 215 as the first end 300. When the fastener 10 is in the closed position, the semi-circular sections 215, 315 are aligned with each other and create an opening configured to capture the tubes, wires, cords, etc. It should be understood that the sections 215, 315 are not limited to semi-circular configurations. Rather, the sections 215, 315 may define numerous other configurations that still function to capture, hold and/or isolate the tubes, wires, cords, etc.

As illustrated in FIGS. 1-3, the second end 200 of the fastener clip 10 may include a horizontal section extending from the semi-circular sections 215 and defining a mounting member such as an aperture 223 for mounting the clip 10 to the vehicle, vehicle panel or other structure. For example, the aperture 223 may be configured to engage a threaded stud, fastener or pin. The horizontal section may be a solid section or may include a void through the section, as illustrated in FIGS. 1 and 2. It should be understood that other techniques may be used to mount the clip 10 to the vehicle or other structure. In addition to the aperture 223, the end 200 may also include an aperture 221 configured to receive the hook 311 of the first end 300 to snap-fit the first and second ends together. The aperture 221 may define numerous other configurations that permit the joining of the first end 300 to the second end 200.

Referring to FIGS. 1-6, the semi-circular sections 215 of the second end 200 may include an opening 222 through the wall of the sections. A flex arm defining a bulbous-like end 226 may be positioned across the opening 222 and may be joined to the semi-circular section 215 through a flexible tapered member 227. The tapered member 227 is configured to flex to permit the end 226 to move radially in and out of the opening formed by the joined semi-circular sections 215 and 315. As shown in FIG. 2, the end 226 may be configured such that it is positioned radially within the opening formed by the joined semi-circular sections 215 and 315. In use, when the fastener 10 is in the closed position, the end 226 may contact the mounted tube, wire, cord, etc. being isolated. The flexible tapered member 227 will force the tube, wire, cord, etc. away from the semi-circular section 215, thereby reducing the surface area contact between the tube, wire, cord, etc. and the semi-circular section 215, which in turn reduces the total surface contact between the fastener clip 10 and the tube, wire, cord, etc. The bulbous-like end 226 and the tapered member 227 function as a reverse megaphone to dampen out general vibration noise. The end 226 and tapered member 227 may be further shaped and configured to target certain oscillation frequencies—frequencies that may include low-pass, high-pass, and/or band-pass, depending on the desired application.

Referring to FIGS. 7-9, another embodiment of the invention is a fastener clip 700 that may be used to capture and isolate a single tube, wire, cord, etc. The fastener clip 700 may define a first end 702 that is connected to a second end 704 by a hinge 706. The hinge 706 allows the first and second ends to pivot relative to each other and to close together. As above, the hinge 706 may be a swivel hinge or, as depicted, a flexible material that simply joins together the first and second ends. It should be understood that other hinges and hinge types, and other techniques, may be used to join together the first and second ends. The first end 702 may further define a hook 711 extending outwardly from the first end 702. The hook 711 may be used to snap fit the first end 702 to the second end 704, vis-à-vis an aperture 721 formed in the second end 704. The aperture 721 may receive the hook 711 and hold the hook 711 in position relative to the second end 704. It should be understood that other techniques may be used join or snap-fit together the first and second ends.

The first end 702 may define a semi-circular section 715 that may further define at least one opening 722 extending through the wall of the section 715. As shown in FIG. 9, at least one flex arm 723 defining a bulbous-like end 726 may be positioned across the opening 722 and may be joined to the semi-circular section 715 through a flexible tapered member 727. In an exemplary embodiment, two flex arms 723 may be positioned across the opening 722, one flexible member extending from each side of the opening 722. Referring to FIG. 7, the ends 726 may be configured such that they are positioned radially within the semi-circular section 715 and may contact a tube, wire, cord, etc. generally depicted by 731. The flex arms 723 will provide a spring-like force to urge the tube, wire, cord, etc. away from the semi-circular section 715, thereby reducing the surface area contact between the tube, wire, cord, etc. and the semi-circular section 715.

The second end 704 may define a semi-circular section 740 that may further include multiple openings 742 extending through the wall of the section 740. A flex arm 744 defining a bulbous-like end 746 may be positioned across each of the openings 742 and may be joined to the semi-circular section 740 through a flexible tapered member 747. As shown in FIG. 7, the ends 746 may be configured such that they are positioned radially within the opening formed by the joined semi-circular sections 715 and 740 and may contact the tube, wire, cord, etc. generally depicted by 731. The flex arms 744 will provide a spring-like force to urge the tube, wire, cord, etc. away from the semi-circular section 740, thereby reducing the surface area contact between the tube, wire, cord, etc. and the semi-circular section 740.

As illustrated in FIG. 8, the tube, wire, cord, etc. 731 may be suspended in the center of the opening formed by semi-circular sections 715 and 740 after the sections are joined together. The tube, wire, cord, etc. 731 may be suspended by the bulbous-like ends 726 and 746. In the exemplary embodiment, the bulbous-like ends 726 and 746 contact the tube, wire, cord, etc. at four points with minimal contact with the fastener clip 700. The depicted configuration dampens undesirable vibration noise. The depicted configuration also allows for fine tuning of the spring-like force of the flex arms which will have a direct effect on dampening out unwanted vibration noise.

In use, as vibration noise in the tube, wire, cord, etc. is transmitted to the bulbous-like ends 726 and 746, the sound travels through the tapered flex arms which become narrower at the base portion that connects with the semi-circular section. The tapering of the flex arms causes the sound to choke as it reaches the base portion, thus dampening the vibration noise.

With the illustrated embodiments, the more flex arms with bulbous-like ends that are used, for example, the more control there will be to fine tune the isolation and dampening properties of the fastener clip and thus target certain oscillation frequencies. Moreover, the fewer flex arms that are used, the greater the dampening effect, especially for tubes, wires, cords, etc. that may be undersized, oblong or that vary in size. In essence, by manipulating and/or configuring the flex arms and bulbous-like ends, the vibration noise frequencies can be controlled or dampened. As an example, the fastener clip 700 having four flex arms and bulbous-like ends has proven effective at dampening noise vibrating between 600 Hz-1000 Hz for vehicle applications, such as the mounting of a vehicle brake line to the vehicle.

Moreover, an additional way of controlling the dampening of noise is through the material used to form the fastener clip 700. By changing the material used, certain undesirable vibration frequencies may be dampened. For example, a softer material will provide better dampening properties at certain frequencies than using a stiffer material, which may be more effective at different frequencies. It should therefore be appreciated that by varying the material used and the configuration of the flex arms and bulbous-like ends, specific vibration frequencies can be effectively dampened.

As illustrated in FIGS. 7-9, the fastener clip 700 may include a mounting member such as a post 800 extending outwardly from the semi-circular section 740. The mounting member may connect the fastener clip 700 to a mounting hole or opening within a panel of a vehicle, for example. As shown in FIGS. 8 and 9, the mounting member in the form of a post 800 may have one or more flexible protrusions 810 that permit the snap-fit mounting of the fastener clip 700 to the mounting hole or opening in the panel. The protrusion 810 may define angled surfaces 801 and 802 extending outwardly and angled toward each other and connected at a flat surface 803. The angled surfaces 801 allow the post 800 to be easily inserted into the hole or opening. As illustrated in FIG. 9, the protrusion 810 may also include a flat surface 805 at the end of the protrusion 810 that allows the post 800 to be retained within the hole or opening because this surface will contact and engage the underside of the panel to which the fastener clip is mounted. The depicted protrusion 810 will also require a relatively large extraction force to remove the fastener clip 700 from the hole or opening. The size, shape and configuration of the protrusion 810 may vary depending on the desired application and the degree of retention required to hold the fastener clip to the hole or opening of the panel. It should be understood that other techniques may be used to mount the fastener clip 700 to the hole or opening in the panel.

Variations and modifications of the foregoing are within the scope of the present invention. For example, the fastener clip 10 may include a latching mechanism to keep the fastener clip 10 in a closed position. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener clip for a vehicle comprising:
a fastener body defining a first end and a second end, the first end and second end joined by a hinge,
the first end defining at least one semi-circular section and a hook,
the second end defining at least one semi-circular section and an opening for receiving the hook, the second end also defining an aperture for mounting the fastener clip to the vehicle, the semi-circular section of the second end defining an other opening therethrough and at least one tapered flex arm extending from an edge of the opening into the semi-circular section of the second end and further defining an end of the tapered flex arm radially inward of the semi-circular section of the second end, said end of the tapered flex arm having a bulbous-like configuration projecting from the arm into the semi-circular section, and said arm tapering from being wider at the bulbous-like configuration to narrower at the semi-circular section of the fastener body second end;
whereby the bulbous-like configuration at the end of the tapered flex arm is positioned to contact a tubular member mounted to the fastener clip and to hold the tubular member away from the semi-circular section of the second end.

2. The fastener clip of claim 1 wherein the first end and second end of the fastener body are joined together by a swivel hinge.

3. The fastener clip of claim 1, wherein the first end further defines at least one tapered flex arm further defining an end.

4. The fastener clip of claim 3 wherein the end of the tapered flex arm of the fastener body first end defines a bulbous-like configuration projecting into the semi-circular section.

5. The fastener clip of claim 1 wherein the tubular member may be selected from the group consisting of tubes, wires, cords, cable bundles, rods, springs or bolts.

6. The fastener clip of claim 1 wherein the semi-circular sections of the first end and second end align with each other to capture the tubular member when the fastener clip is in a closed position.

7. The fastener clip of claim 1 wherein the first and second ends each define more than one semi-circular section.

8. A fastener clip for a vehicle comprising:
a fastener body defining a first end and a second end, the first end and second end joined by a swivel hinge,
the first end defining at least one semi-circular section,
the second end defining at least one semi-circular section, the second end also defining a mounting member for mounting the fastener clip to the vehicle, the semi-circular section of the second end defining an opening therethrough and at least one tapered flex arm further extending into the opening and defining a bulbous-like end that extends from the arm radially inward of the semi-circular section of the second end, and said arm tapering from wider at the bulbous-like end to narrower at the semi-circular section of the fastener body second end.

9. The fastener clip of claim 8 wherein the swivel hinge permits relative movement between the first end and second end.

10. The fastener clip of claim 8 wherein the first end further defines an opening therethrough and at least one tapered flex arm extending into the opening and further defining an end radially inward of the at least one semi-circular section of the first end, wherein the end contacts a tubular member mounted to the fastener clip.

11. The fastener clip of claim 10 wherein the ends of the tapered flex arms are positioned radially within an opening formed by the semi-circular sections of the joined ends.

12. The fastener clip of claim 11 wherein each of the ends of the tapered flex arms are positioned in an opening formed in the respective semi-circular sections of the first and second ends.

13. The fastener clip of claim 10 wherein the tubular member may be selected from the group consisting of tubes, wires, cords, cable bundles, rods, springs or bolts.

14. The fastener clip of claim 13 wherein the semi-circular sections of the first end and second end align with each other to capture the tubular member when the fastener clip is in a closed position.

15. The fastener clip of claim 14 wherein the first and second ends each define more than one semi-circular section.

16. A fastener clip for a vehicle comprising:
a fastener body defining a first end and a second end, the first end and second end joined by a hinge that permits relative movement between the first and second ends,
the first end defining at least one opening therethrough and a tapered flex arm extending across the opening and having a bulbous end, the first end further defining a hook that engages the second end to permit the first and second ends to snap fit together,
the second end defining at least one opening therethrough and a tapered flex arm extending across the opening and having a bulbous end, the second end also defining a mounting member for mounting the fastener clip to the vehicle,
the bulbous-like ends of the tapered flex arms positioned inwardly on the arms relative to the openings to contact a tubular member mounted to the fastener clip to suspend the tubular member and to reduce vibration noise caused by the tubular member, and
the arms tapering from wider at the bulbous-like ends to narrower at the fastener body first and second ends.

17. The fastener clip of claim 16 wherein the tapered flex arms position the bulbous-like ends against the tubular member without the tapered flex arms contacting the tubular member.

18. The fastener clip of claim 16 wherein the mounting member includes a post and flexible protrusions.

19. The fastener clip of claim 16 wherein the first and second ends each define semi-circular sections that will align with each other to capture the tubular member when the fastener clip is in a closed position, and the openings through the first and second ends extend through the semi-circular sections.

* * * * *